(12) United States Patent
Inui et al.

(10) Patent No.: US 6,295,389 B1
(45) Date of Patent: *Sep. 25, 2001

(54) IMAGE FORMING APPARATUS THAT FACILITATES OPERATION SETTING

(75) Inventors: Kazuo Inui, Toyohashi; Junko Natsume, Aichi-Ken; Hiroshi Yamada, Toyokawa, all of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/944,884

(22) Filed: Oct. 6, 1997

(30) Foreign Application Priority Data

Dec. 24, 1996 (JP) .................................... 8-343311

(51) Int. Cl.⁷ ...................................... G06K 7/00
(52) U.S. Cl. .................... 382/312; 382/317; 382/318
(58) Field of Search ................. 382/312, 314, 382/317, 318, 406, 468, 471, 319; 358/412, 486, 474

(56) References Cited

U.S. PATENT DOCUMENTS

| | | | |
|---|---|---|---|
| 5,032,867 | * 7/1991 | Nagata et al. | 355/68 |
| 5,198,909 | * 3/1993 | Ogiwara et al. | 358/412 |
| 5,581,344 | * 12/1996 | Makita | 355/311 |
| 5,857,137 | * 1/1999 | Sakata et al. | 399/402 |

FOREIGN PATENT DOCUMENTS

| | | |
|---|---|---|
| 62-210481 | 9/1987 | (JP) . |
| 4-119364 | 4/1992 | (JP) . |

* cited by examiner

*Primary Examiner*—Andrew W. Johns
*Assistant Examiner*—Seyed Azarian
(74) *Attorney, Agent, or Firm*—Sidley Austin Brown & Wood

(57) ABSTRACT

In a copy machine which is one type of an image forming apparatus, a job out of a plurality of jobs to be displayed on a display is selected according to a state of the copy machine and an operation towards the copy machine. When the copy machine is currently carrying out an operation, either a print operation or a read operation is selected with the read operation having a higher priority. When an error occurs resulting in of the copy machine being halted, the job causing the error is selected. When the copy machine currently attains a stop state, a predetermined setting carried out by the operator with respect to the copy machine is selected. The selected job is displayed on the display as the current job which is a job of the operator. Since the operator can identify the contents of the job according to the state of the copy machine, an image forming apparatus with a multi-job function is provided that can be easily handled by the operator.

10 Claims, 12 Drawing Sheets

→ : FLOW OF IMAGE DATA

FIG.12

| LARGE AREA MESSAGE | PAPER EMPTY SUPPLY SHEET |

| SMALL AREA MESSAGE | PAPER EMPTY |

IMAGE FORMING APPARATUS THAT FACILITATES OPERATION SETTING

FIELD OF THE INVENTION

The present invention relates to image forming apparatuses, and particularly to an image forming apparatus that has a multi-job function.

BACKGROUND OF THE INVENTION

Conventional image forming apparatuses that allow setting of an operation mode for a plurality of jobs are known. Such image forming apparatuses are disclosed in Japanese Laid-Open Patent Nos. 62-210481 and 4-119364, for example.

The copy machine disclosed in Japanese Laid-Open Patent No. 62-210481 has a multi-job function. This multi-job function allows the operation conditions of a job to be entered during the recording operation of another job. This copying machine includes a first display for displaying the operation condition o f a job that is currently being recorded, and a second display for providing display of the operation condition of another job that is currently being entered. The copy machine disclosed in Japanese Laid-Open Patent No. 4-119364 allows alternate display of an operation corresponding to a first job and an operation corresponding to a second job on one display.

In the above-described conventional image forming apparatuses, it is not easy to identify to which original group the displayed plurality of operation conditions corresponds. The operator is often confused at the presence of a plurality of displays.

SUMMARY OF THE INVENTION

In view of the foregoing, an object of the present invention is to provide an image forming apparatus that allows multi-jobs that can be handled easily.

Another object of the present invention is to allow an operator to reliably set a desired operation in an image forming apparatus with a multi-job function.

A further object of the present invention is to allow an operator to identify an operation condition of a desired operation in an image forming apparatus with a multi-job function.

The above objects of the present invention can be achieved by an image forming apparatus set forth in the following.

An image forming apparatus according to an aspect of the present invention includes an image reader, an image forming device that can form an image by a plurality of operation conditions, a first sense device for sensing a state of the image reader, a second sense device for sensing a state of the image forming device, a determination device for determining a state of the image forming apparatus according to sensed results of the first and second sense devices, and a display for providing a display of information related to a result of the determination device.

The states of the image reader and the image forming device are sensed, whereby the state of the image forming apparatus is determined and the result is displayed. Since the state of the image forming apparatus is provided on a display, the operation that can be set and the job to be set by the operator can be reliably displayed. As a result, an image forming apparatus that allows multi-jobs that can be handled easily is provided.

According to another aspect of the present invention, an image forming apparatus includes an image reader, an image forming device that allows an image to be formed by a plurality of operation conditions, a first sense device for sensing a state of the image reader, a second sense device for sensing a state of the image forming device, a determination device for determining a state of the image forming apparatus according to the sensed results of the first and second sense devices, and a display unit for displaying information related to the result of the determination device. The display device includes a first display for displaying a determined state of the image forming apparatus, and a second display for displaying a state excluding the determined state of the image forming apparatus.

The states of the image reader and the image forming device are sensed, whereby the state of the image forming apparatus is determined. Information related to that result is displayed on the first display, and other information is displayed on the second display. For example, the state of the operation conditions and the like of the image forming apparatus set by the operator is provided on the first display, and other information is provided on the second display. Therefore, the operator can easily identify the desired operation condition of the image forming apparatus. Thus, an image forming apparatus that allows multi-jobs that can be handled easily is provided.

Preferably, the first display is greater in area than the second display.

Therefore, the first and second displays can be used appropriately corresponding to the level of importance. By providing the data set by the operator on the first display, and other data on the second display, an image forming apparatus that allows a desired setting upon identifying the operative state of the image forming apparatus can be provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 12 shows a message provided on a display.

DESCRIPTION OF THE PREFERRED EMBODIMENTS

A copy machine with a multi-job function according to one embodiment of the present invention will be described hereinafter with reference to the drawings.

Figure 1:
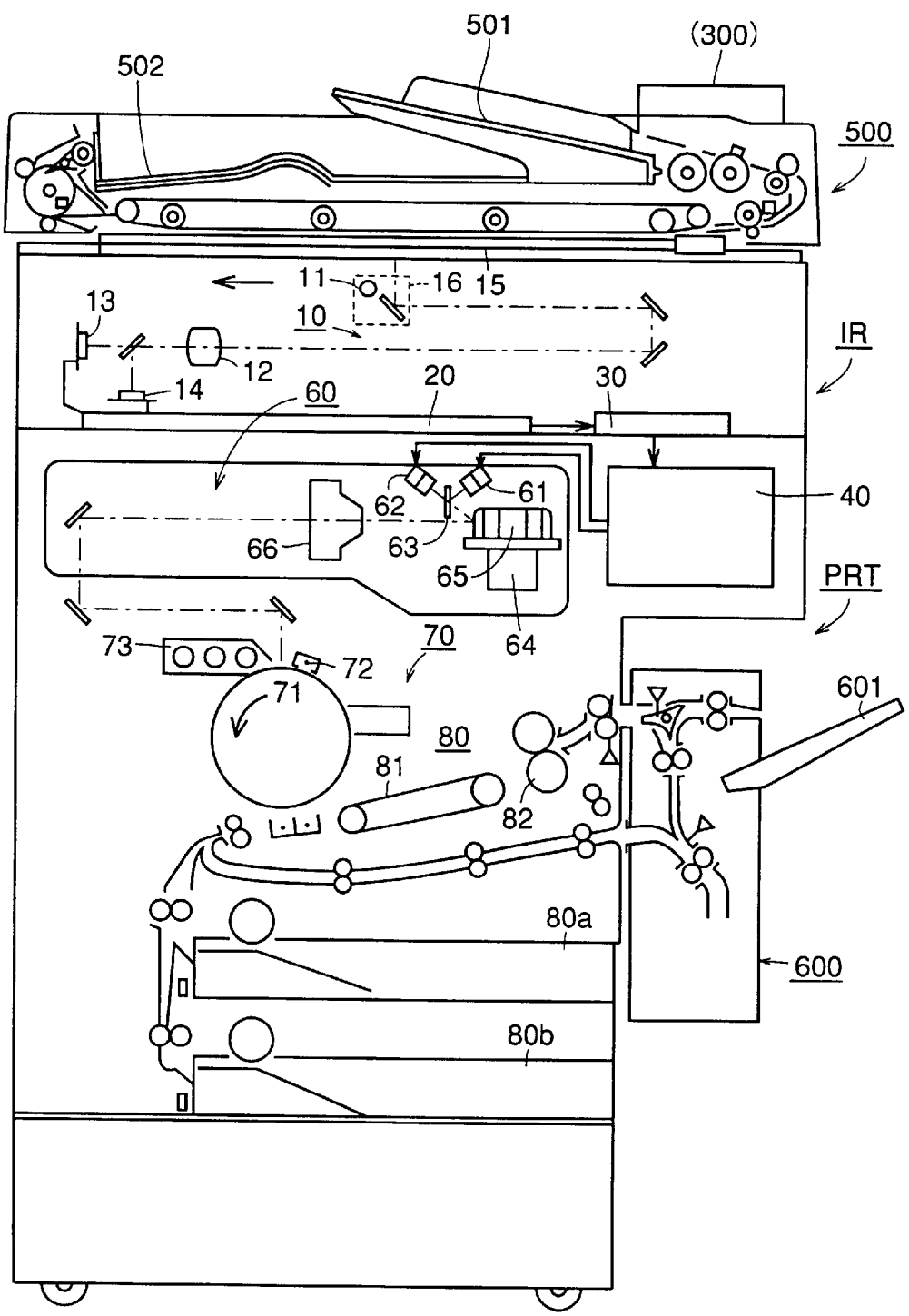
FIG. 1 is a schematic sectional view of a structure of a copy machine having a multi-job function.

Referring to FIG. 1, a copy machine 1 with a multi-job function includes an image reader IR for reading out an image of an original for generating image data, an image storage unit 30 for temporarily storing image data obtained by image reader IR, a printer device PRT for printing on a copy sheet according to image data stored in image storage unit 30, an operation panel 300 for entering an operation (set on the top plane of copy machine 1 perpendicular to the sheet plane of the drawing), an original transport unit 500 for conveying an original and inverting the top and back sides of the original, if necessary, and a refeed unit 600 for inverting the sides of a copy sheet subjected to one copy pass and refeeding the copy sheet to printer device PRT. These operations are controlled by a control unit not shown. The control unit includes a ROM for storing a program to operate copy machine 1, a CPU for executing a program, and a RAM for storing information required for the execution of a program.

In response to a print command, one or a plurality of originals set on an original feed tray 501 in image transport unit 500 is set at a read position on platen glass 15 starting from the bottom sheet of the originals. Upon completion of the readout of an original by image reader IR, the original is discharged on a discharge tray 502.

Image reader IR includes a scanning system 10 and an image signal processing unit 20. In scanning system 1, an image of an original set at the read position is exposed by an exposure lamp 11 attached to a scanner 16 traveling below the original. The reflected light from the original passes through a reflection mirror and a condenser lens 12 to enter photoelectric conversion elements 13 and 14 such as a CCD array. The signal obtained by scanning system 10 is provided to image signal processing unit 20 to be subjected to an appropriate image process such as binarization, picture quality correction, scale magnification, image editing, and the like.

The image data subjected to an image process is stored in image storage unit 30.

Printer device PRT includes a print processing unit 40, an optical system 60, an image forming system 70, and a sheet transport system 80. Print processing unit 40 drives optical system 60 according to the image data from image storage unit 30. In optical system 60, semiconductor lasers 61 and 62 respectively emit laser beams according to a signal under control of print processing unit 40. The laser beam is combined by a dichroic mirror 63 and reflected by a polygon mirror 65 that is rotated by a motor 64 to be directed towards a photoconductor 71 of image forming system 70 through a main lens 66.

In image forming system 70, photoconductor 71 is charged by a corona charger 72. Then, a laser beam is issued from optical system 60, whereby an electrostatic image is formed on photoconductor 71. Toner is provided on the electrostatic image by a developing unit 73. The toner image on photoconductor 71 is transferred on a copy sheet fed from a sheet feed cassette 80a or 80b of sheet transport system 80.

The sheet is conveyed to a fixing unit 82 by a sheet transport belt 81. The toner image is fixed on the sheet by heat and pressure, whereby the sheet is discharged on discharge tray 601 of refeed unit 600.

In copy machine 1, an error such as sheet jamming and the like can be detected by original transport unit 500 and print device PRT. In print device PRT, an out-of-sheet error of a sheet feed cassette can be sensed. In original transport unit 500, an error such as a misplaced original at the reader position can be sensed. Furthermore, cessation of the operation of copy machine 1 by malfunction and the like can be sensed.

Figure 2:
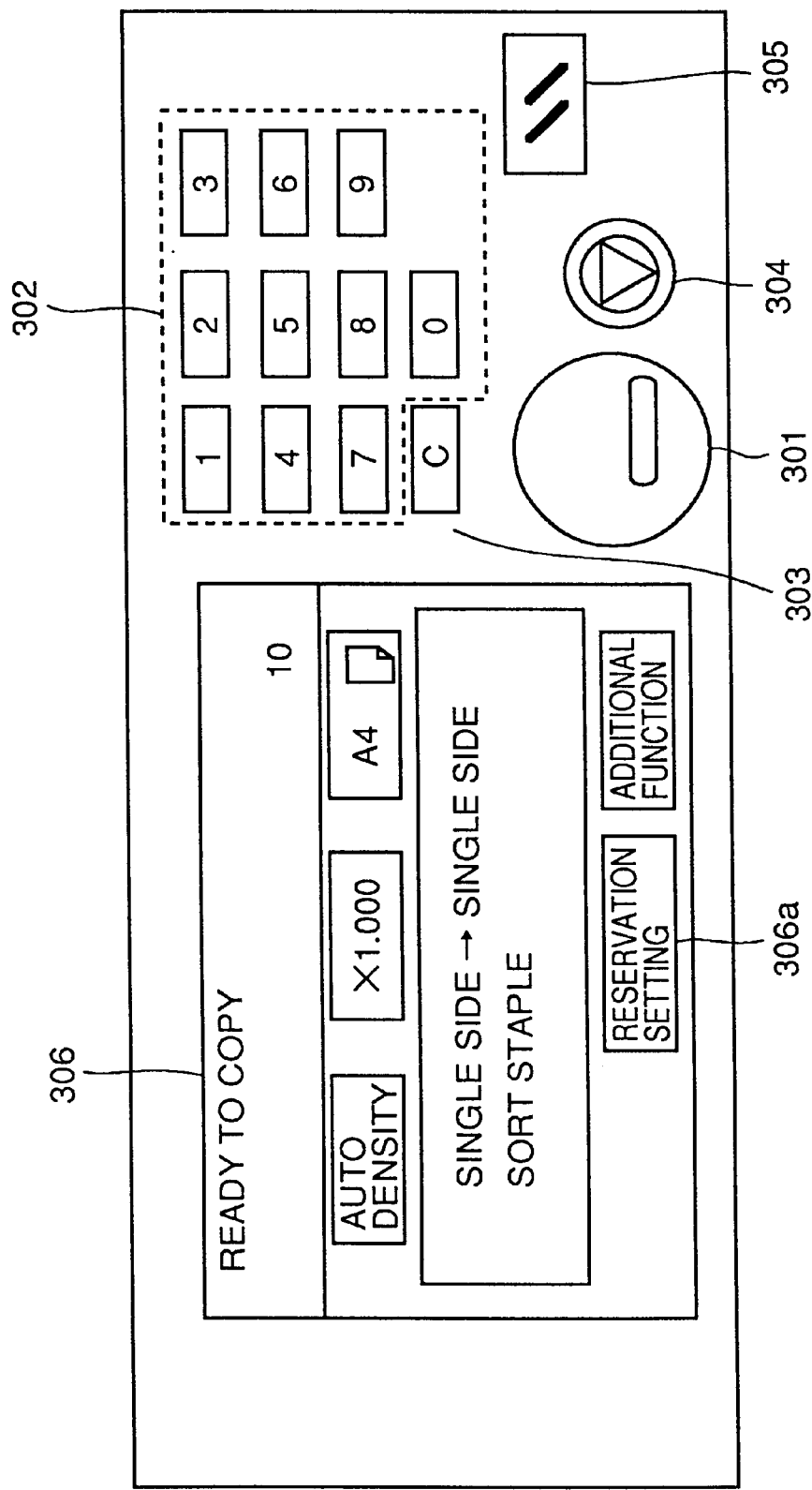
FIG. 2 is a plan view of an operational panel of a copy machine.

FIG. 2 is a plan view showing a structure of an operation panel 300 of copy machine 1. A start key 301 is used to initiate a copy operation. A ten-key 302 is used to enter numeric values such as the number of copies to take. A clear key 303 is used to clear an input numeric or the image data in image storage unit 30. A stop key 304 is used to stop a copy operation. A panel reset key 305 is used to cancel a set mode or job.

Also, a liquid crystal display LCD 306 is provided with a touch panel at the surface thereof. Various settings according to the displayed content in LCD 306 can be carried out by this touch panel. For example, when a reservation set key 306a is displayed in LCD 306, depression thereof allows a reservation job to be set.

Figure 3:
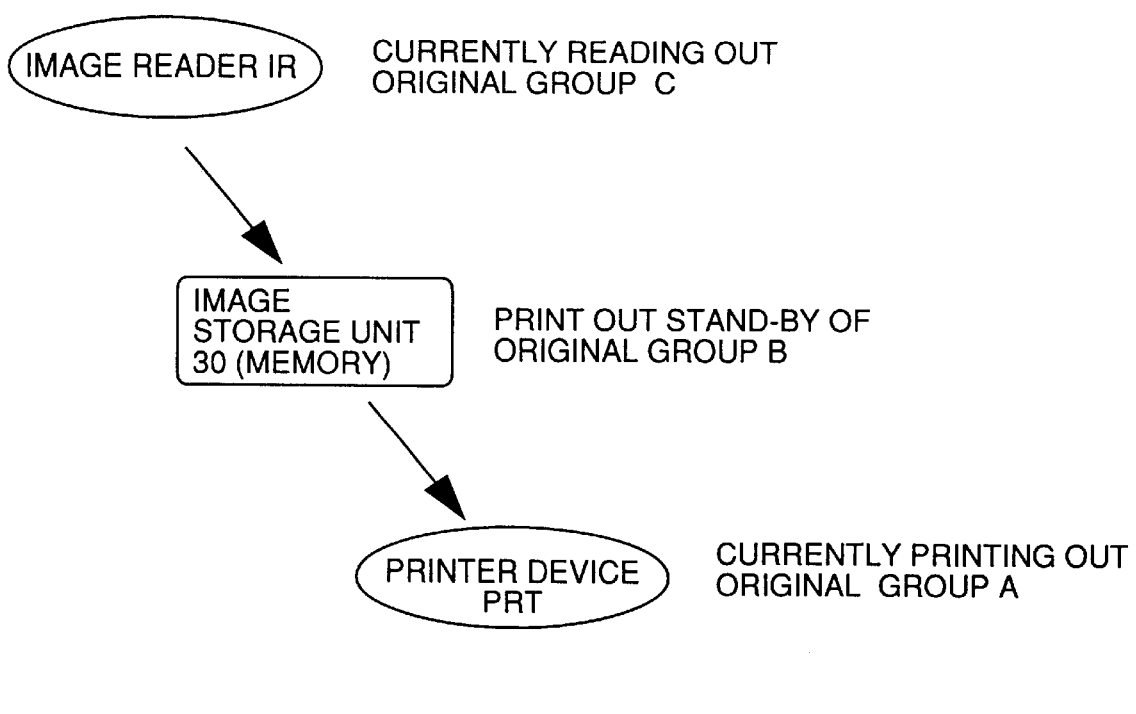
FIG. 3 is a flow diagram of a multi-job operation in a copy machine.

FIG. 3 is a diagram for describing a multi-job operation in copy machine 1. The operation carried out by copy machine 1 starting from a set original up to obtaining a copied sheet is divided mainly into three processes. More specifically, a process of reading out the image of an original for generating image data, a process of correcting and storing image data, and a process of printing out an image according to the stored image data are carried out. A series of these three processes are carried out on a group of originals in this order to obtain a copy of that original group. These three processes are carried out by reader IR, image storage unit 30, and printer device PRT, respectively. (Each of these "processes" is also called "job" hereinafter.)

A multi-job carried out by copy machine 1 refers to the operation of, during output of a copy of an original group A by printer device PRT, storage of an original group B differing from original group A into image storage unit 30 while reading out another original group C by image reader IR. By the multi-job function, the print operation, the read out operation, and the write operation into image storage unit 30 are carried out independently.

Since the print operation and the read out operation are carried out independently, a malfunction to cause cessation of either the print operation or read out operation that are carried out simultaneously will not affect the other operation. The other operation can be continued even when one operation stops.

Figure 4:
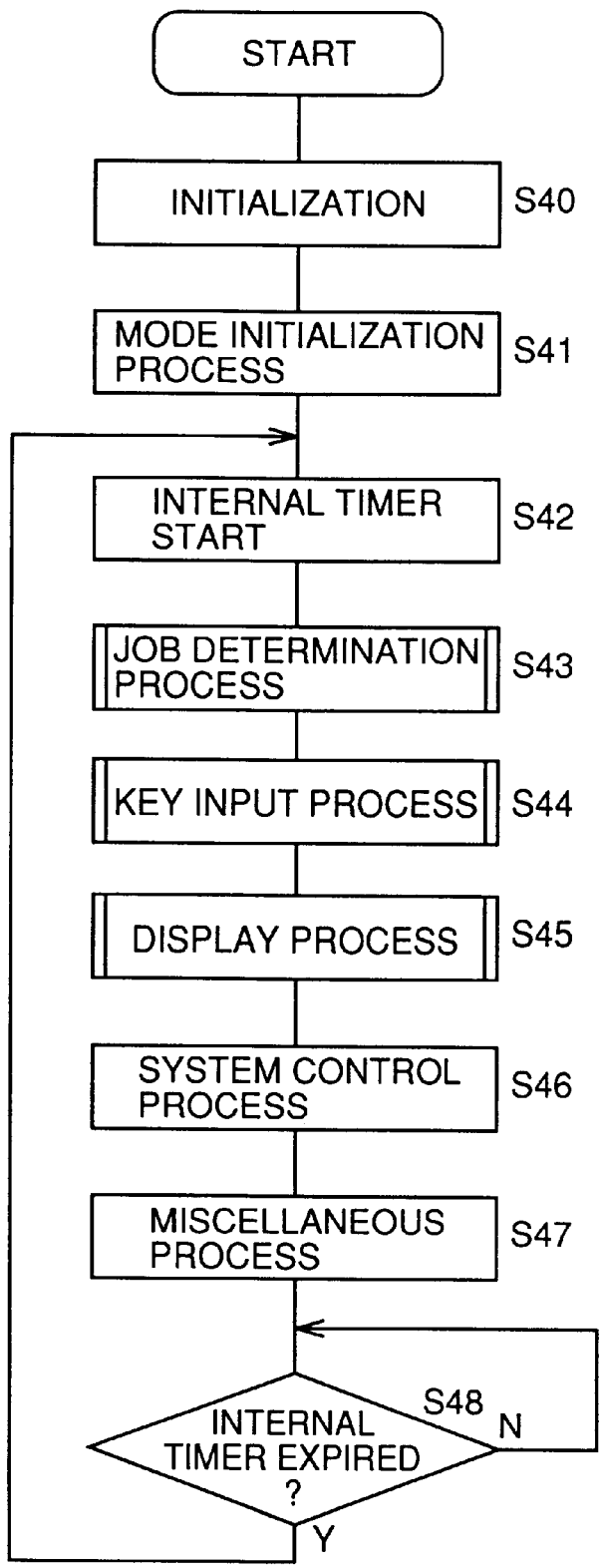
FIG. 4 is a flow chart of the main routine carried out by a CPU for controlling the operation of a copy machine.

FIG. 4 is a flow chart of the main routine carried out by a CPU that controls the operation of copy machine 1.

When the power of copy machine 1 is turned on and the CPU is reset, the program starts. At step 40 (step abbreviated as S hereinafter), initialization of the CPU is executed such as clearing the RAM and setting various registers. At S41, a mode initialization process of copy machine 1 is carried out.

At S42, the count of an internal timer incorporated in the CPU is initiated. The value of the internal timer defines the length of one routine that is preset at the initial setting.

At S43, a job determination process is carried out for determining the state of the current job. At S44, a key input control process is carried out for controlling the key entry via a hard key and a touch panel. At S45, a display control process is carried out for controlling the display of the LCD and the LED. The processes of S43–45 are carried out in subroutines, which will be described afterwards.

At S46, a system control process for controlling the operation of copy machine 1 is carried out. At S47, a miscellaneous process is carried out.

Following the processes of S42–S47, determination is made whether the internal timer set at S42 has expired or not at S48. When determination is made that the internal timer has expired (S48:YES), the one routine has been completed, and the control returns to S42. When the internal timer has not yet expired (S48:NO), the control remains at S48.

Figure 5:
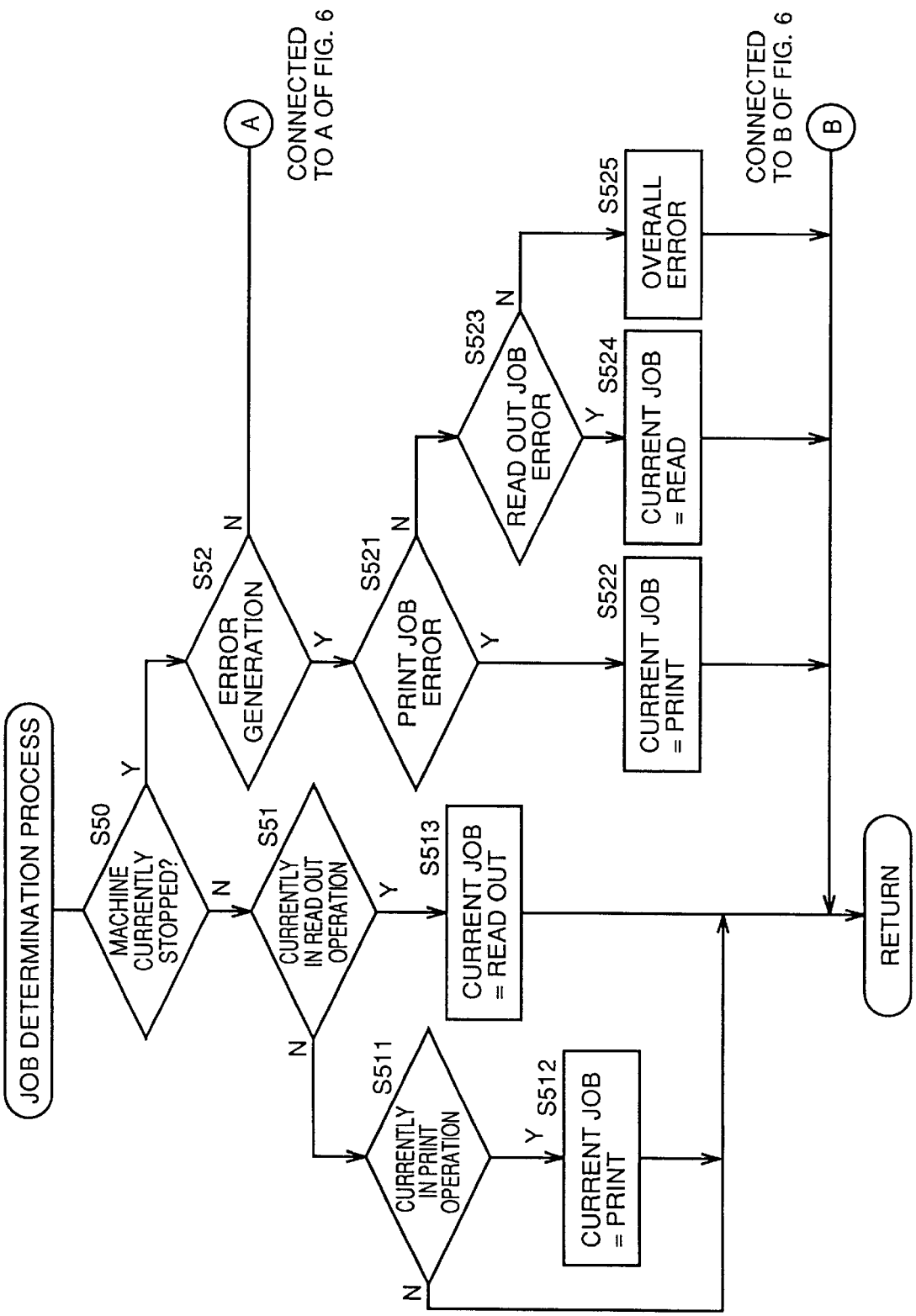
FIGS. 5 and 6 are first and second flow charts, respectively, showing the subroutines of a job determination process of S43 of FIG. 4.
Figure 6:
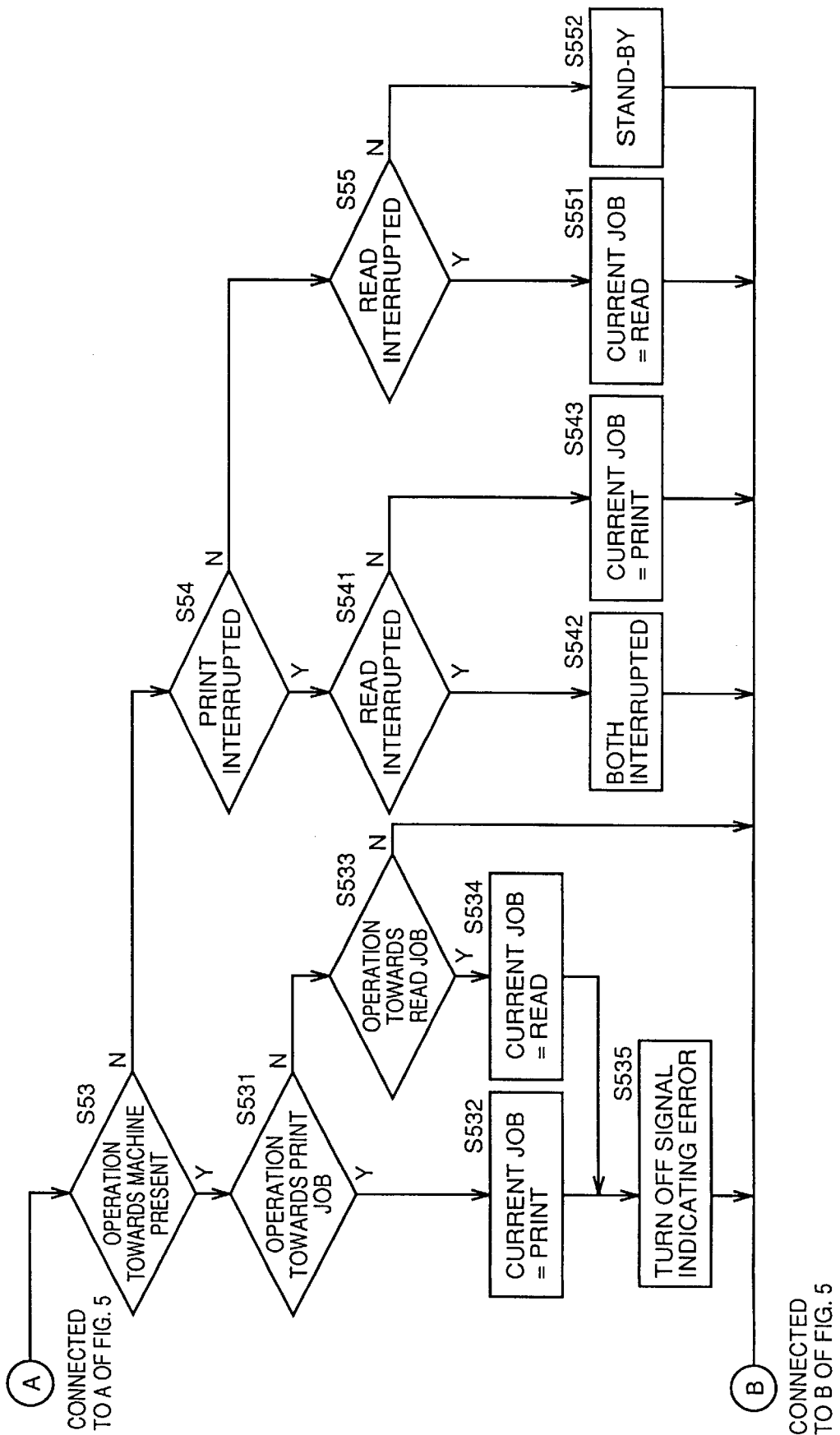

FIGS. 5 and 6 are flow charts showing the subroutines of the job determination process of S43 of FIG. 4. Here, "current job" refers to a user's job that is identified as being operated with respect to copy machine 1 out of the plurality of jobs carried out by copy machine 1. In contrast, a job other than the current job is referred to as a subjob. Here, a job refers to either a read out or a print out job.

At S50, determination is made whether copy machine 1 attains a stop state by checking a stop flag that is set when copy machine 1 ceases its operation. When NO at S50, the control proceeds to S51 to determine whether copy machine 1 is currently carrying out a read out operation by checking a read flag that is set when a read out operation is initiated. When YES at S51, the control proceeds to S513. The current job is set to "read". Then, the control returns to the main routine.

When copy machine 1 is not currently carrying out a read out operation (S51:NO), the control proceeds to S511 where determination is made whether a print out operation is currently carried out or not by checking a print out flag that is set when a printing operation is initiated. When YES at S511, the control proceeds to S512. The current job is set to "print". Then, the control returns to the main routine. When copy machine 1 is not currently carrying out a print out operation (S511:NO), the control returns to the main routine with the current job maintained at the state prior to calling up the main routine.

When copy machine 1 attains a stop state (S50:YES), the control proceeds to S52 to determine whether an error (such as the aforementioned sheet jamming and the like) has occurred by checking a signal set forth in the following. This signal corresponds to a flag that is set for each type of error (for example, the site of jamming in the case of sheet jamming). In copy machine 1, a signal indicating the presence of an error is turned on the moment an error occurs. The signal indicating the existence of an error is turned off the moment copy machine 1 has recovered from the error. When an error has occurred (S52:YES), control proceeds to S521 and S523 to identify the type of error.

At S521, determination is made whether the error has occurred in the print job by checking a flag that is set when an error occurs in a print job. When YES at S521, the control proceeds to S522 to set the current job to "print". Then, the control returns to the main routine. When NO at S521, the control proceeds to S523 to determine whether the error has occurred in a readout job by checking a flag that is established when an error occurs in a readout job. When YES at S523, the control proceeds to S524 to set the current job to "read". Then, the control returns to the main routine. When the error is not one caused by a read out job (S523:NO) (and the error has not originated from a print job), the control proceeds to S525. The error is assumed to be an overall error of copy machine 1 by malfunction and the like.

When no error has generated (S52;NO), the control proceeds to S53 to determine whether an operator's operation (for example, opening/closing the cover, a process to cancel an error, and the like) is carried out with respect to copy machine 1 by identifying whether a relevant sensor has detected opening/closing of the cover, or whether a reset key for canceling the error has been depressed.

When YES at S53, control proceeds to S531 to determine whether an appropriate process has been carried out with respect to the error in the print job by detecting whether the corresponding sensor no longer detects an error. For example, determination is made whether a jam detection sensor of an appropriate site where jamming has occurred detects a sheet or not. When YES at S531, the control proceeds to S532 to set the current job to "print". Then, the signal indicating presence of an error described with reference to S535 is turned off. Then, the control returns to the main routine. When NO at S531, the control proceeds to S533 to determine whether an appropriate process has been carried out for the error in the read out job. When YES S533, the control proceeds to S534 to set the current job to "read". Similar to the process of the print job error, the signal indicating presence of an error described with reference to S535 is turned off, and the control returns to the main routine. When NO at S533, the control returns to the main routine.

When no operation has been carried out with respect to copy machine 1 (S53:NO), the control proceeds to S54, S541, and S55 to identify what kind of interruption state copy machine 1 attains. At S54, determination is made whether the copy operation is interrupted or not.

The print interruption flag that is set when a print operation is interrupted is checked. If the print operation is interrupted (S54:YES), the control proceeds to S541 to determine whether a read out operation of copy machine 1 is interrupted by checking a relevant flag that is set at the time of a read out operation interruption. When a read out operation is interrupted (S541:YES) (and also a print operation is interrupted), the control proceeds to S542 to determine that both operations are now interrupted. Then, the control returns to the main routine. When NO at S541, the current job is set to "print". Then, the control returns to the main routine.

When a print operation is not interrupted (S54:NO), the control proceeds to S55 to determine whether a read out operation is currently interrupted. If YES at S55, the control proceeds to S51 to set the current job to "read". Then, the control returns to the main routine. When NO at S55, the control proceeds to S552 to determine that both jobs attain a standby state. Then, the control returns to the main routine. Thus, the state of the current job is determined.

Figure 7:
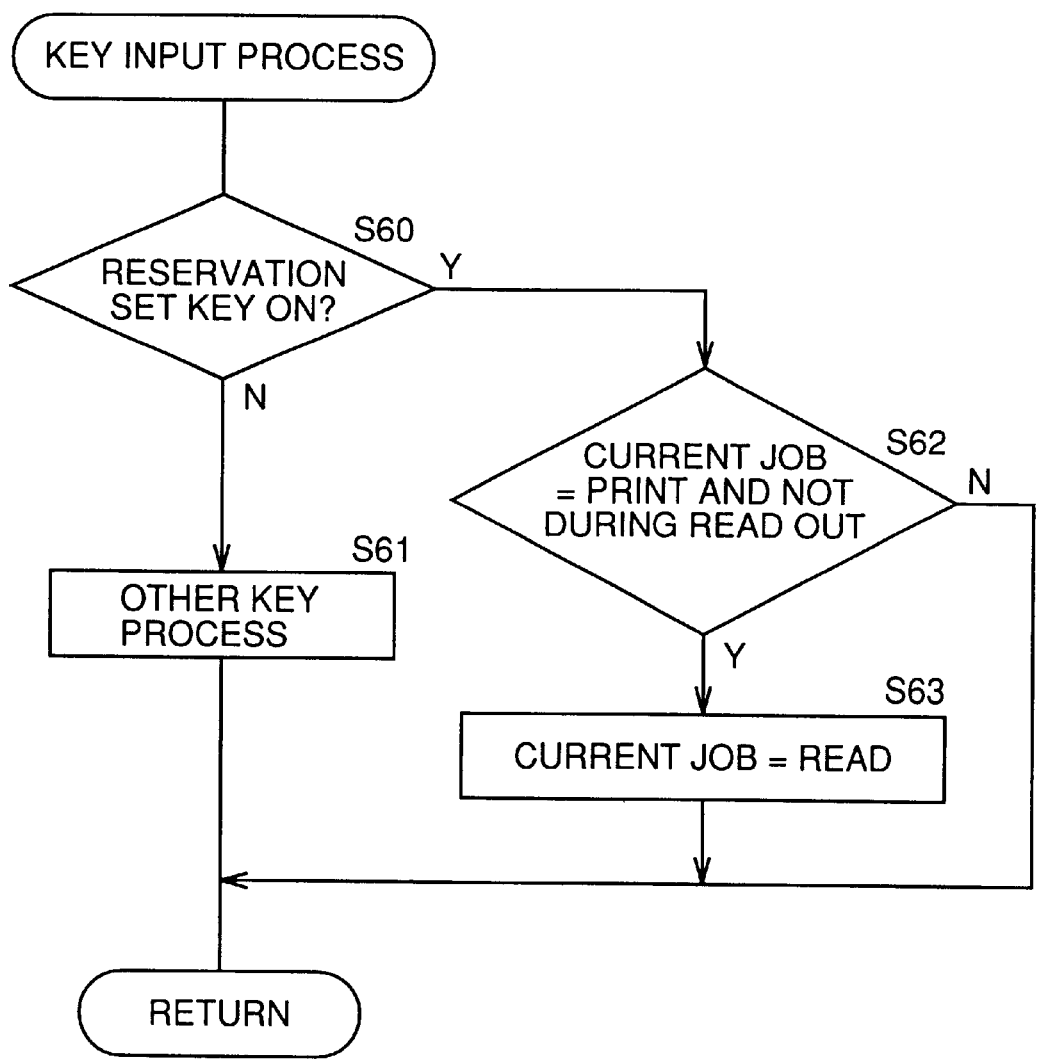
FIG. 7 is a flow chart showing the subroutine of a key input process of S44 of FIG. 4.

FIG. 7 is a flow chart showing the subroutine of the key input process of S44 of FIG. 4.

At S60, determination is made whether a reservation set key 306a is depressed or not. When YES at S60, the control proceeds to S63 to determine whether the current job is "print", and that a subjob is not currently read out (in other words, only a print job is currently executed). When YES at S62, the current job is set to "read", and the control returns to the main routine. When NO at S62, the control returns to the main routine.

When reservation set key 306a is not depressed (S60:NO), an input process through keys other than reservation set key 306a, i.e. print key 301, ten key 302, clear key 303, stop key 304, and panel reset key 305, and also the touch panel of LCD 306 is carried out.

Figure 8:
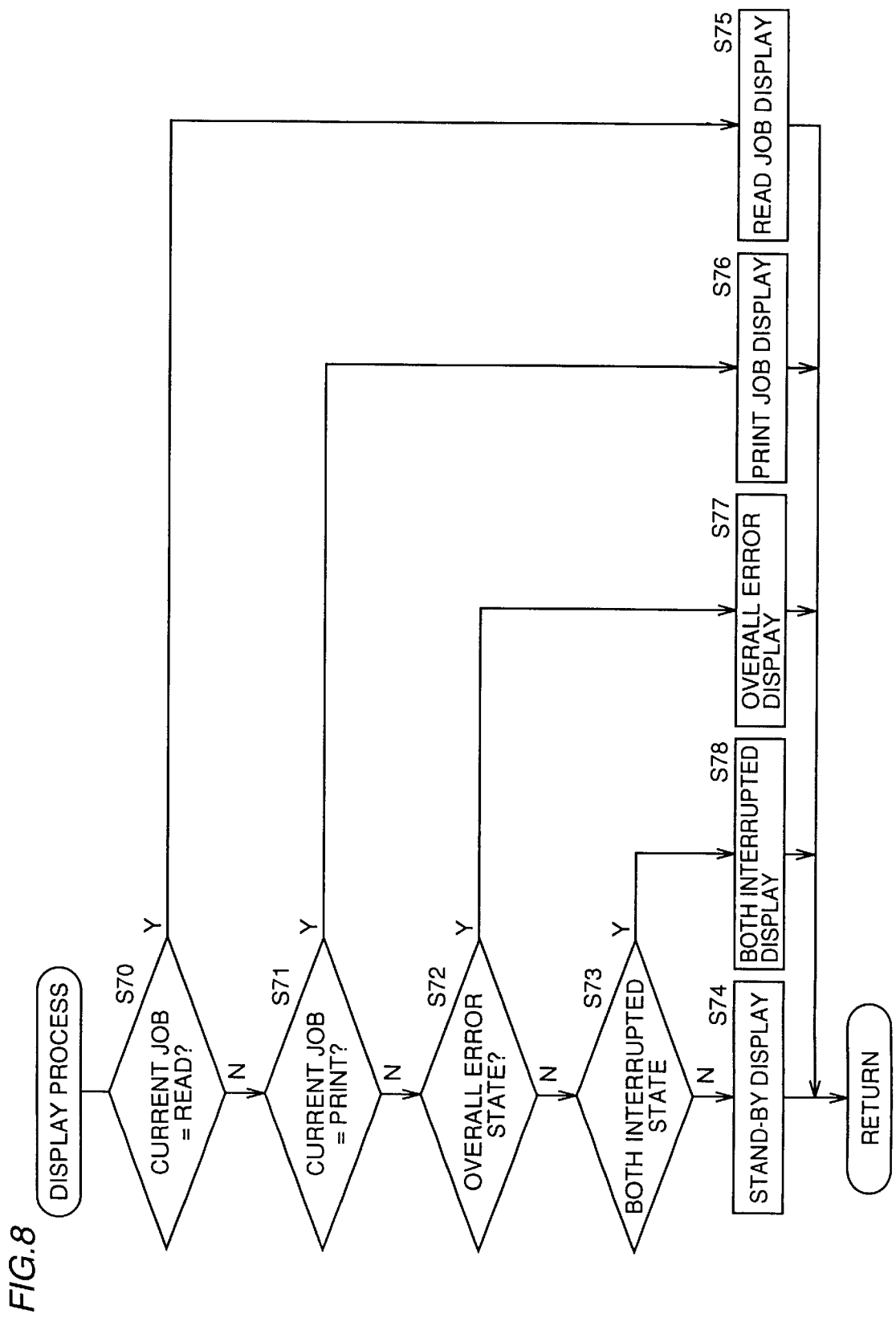
FIG. 8 is a flow chart of the subroutine of a display process of S45 of FIG. 4.

FIG. 8 is a flow chart showing the subroutine of the display process of S45 of FIG. 4.

At S70, determination is made whether the current job is "read out" or not. When YES at S70, the control proceeds to S75 to provide a display related to the read out job. Then, the control returns to the main routine.

When the current job is not "read" (S70:NO), the control proceeds to S71 to determine whether the current job is "print". When YES at S71, the control proceeds to S76 to provide a display related to the print job. Then, the control returns to the main routine.

When the current job is not "print" (S71:NO), the control proceeds to S72 to determine whether copy machine 1 attains the overall error state or not. When (YES at S72), the control proceeds to S77 to provide a display related to the overall error. Then, the control returns to the main routine.

When NO at S72, the control proceeds to S73 to determine whether both the read and print operations are interrupted. When YES at S73, the control proceeds to S78. A display indicating that both operations are interrupted is provided. Then, the control returns to the main routine.

When NO at S73, the control proceeds to S74. A display indicating that copy machine 1 attains a standby state (no job is carried out by copy machine 1) is provided. Then, the control returns to the main routine.

Copy machine 1 according to an embodiment of the present invention provides only the display of the current job on the display. During the operation of either or both the read and print jobs, copy machine 1 provides a display of an operator's job that is currently being carried out with respect to copy machine 1, or that is to be operated on the basis of the internal state and an operation by the operator.

Thus, the operator can easily handle the present image forming apparatus with a multi-job function.

By modifying the procedure of the CPU control as set forth in the following, the display can be divided into a large area and a small area to display simultaneously the current job and the subjob in respective areas.

Figure 9:
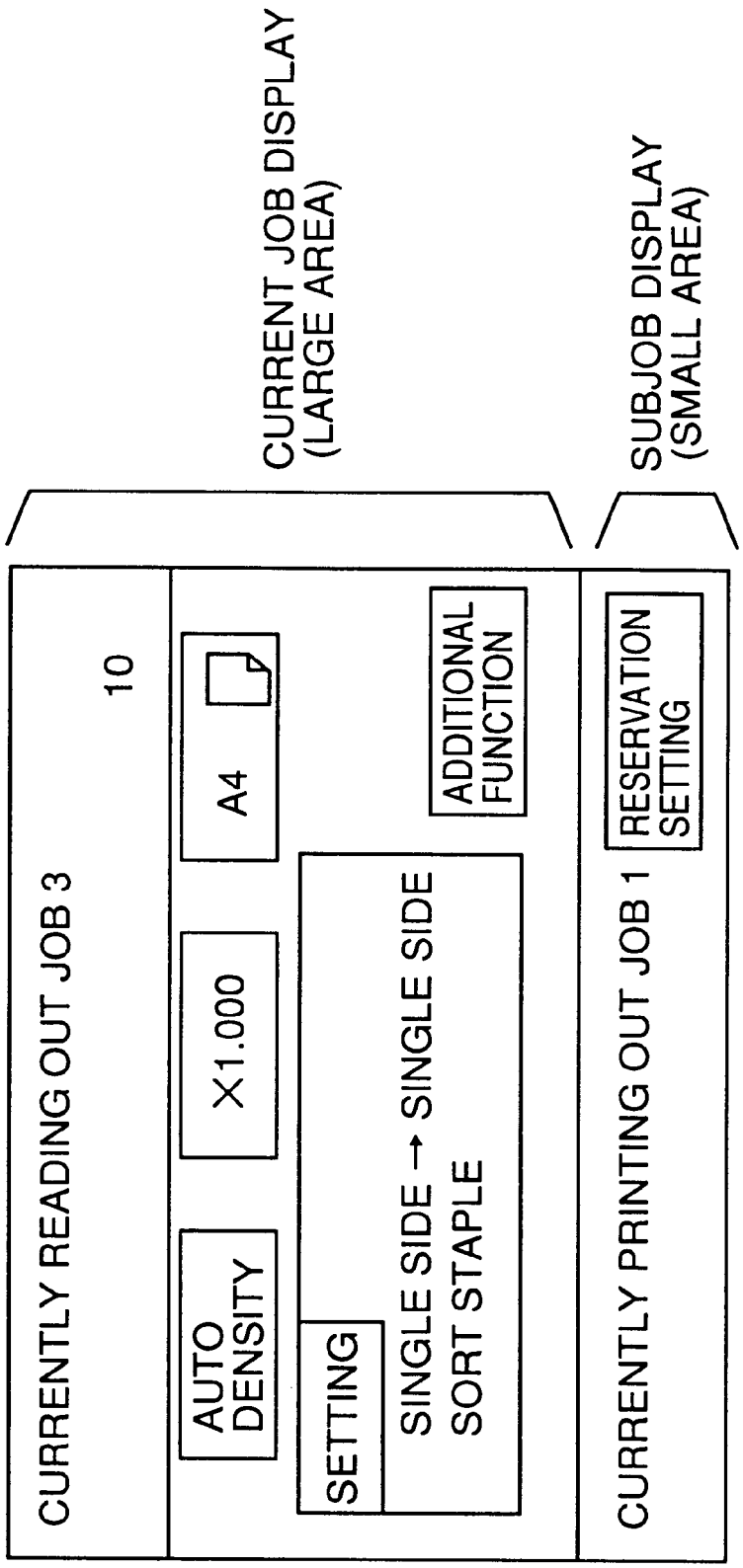
FIG. 9 is a plan view of an operation panel with a display device divided into a large area and a small area.

FIG. 9 is a plan view showing a structure of an LCD that is divided into a large area and a small area. In a LCD 307 of the operation panel, the current job is displayed at the large area, and the subjob is displayed at the small area. The keys forming the operation panel other than the LCD are similar to those of the aforementioned operation panel (FIG. 2). When a key other than the touch panel of LCD 307 is depressed, copy machine 1 will determine that a key input has been made with respect to the current job displayed on the large area of LCD 307.

This simultaneous display of a current job and a subjob necessiates insertion of a subjob determination process routine between the job determination process of S43 and the key input process of S44 in the flow chart of FIG. 4, and also a modification of the display process routine of S45.

Figure 10:
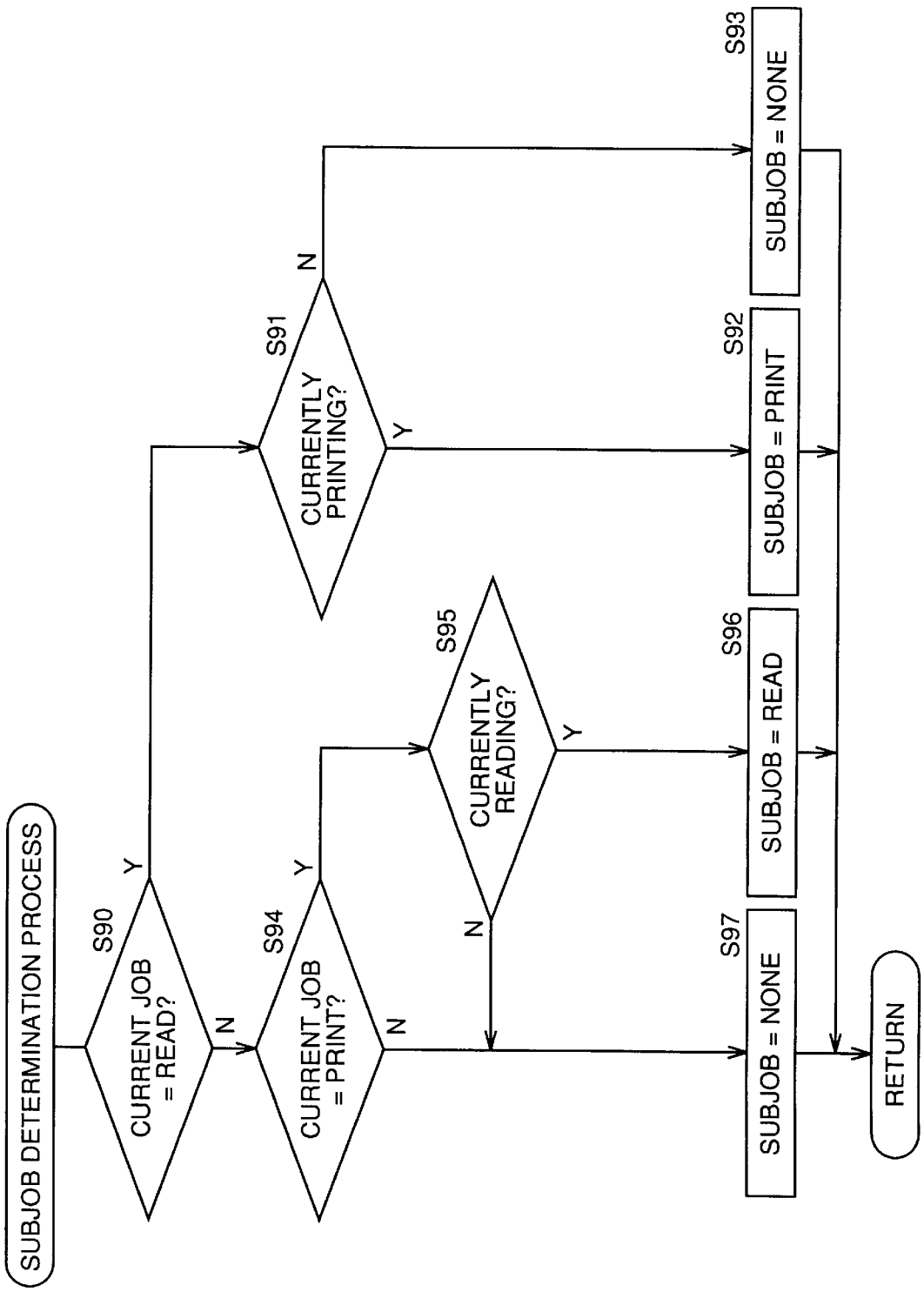
FIG. 10 is a flow chart of the subroutine of a subjob determination process inserted between the subroutines of the job determination process of S43 and the key input process of S44 of FIG. 4.

FIG. 10 is a flow chart of the subjob determination process subroutine inserted between the job determination process of S43 and the key input process of S44.

The contents of the current job and the subjob are determined by the information stored in the memory when a current job or a subjob is set.

At S90, determination is made whether the current job is "read" or not. If YES at S90, the control proceeds to S91 to determine whether a print out operation is currently carried out by checking the print flag. When a printing operation is carried out (S91:YES), the control proceeds to S92 to set the subjob to "print". Then, the control returns to the main routine. When NO at S91, the control proceeds to S93 to set the subjob to "none". Then, the control returns to the main routine.

When the current job is not "read" (S90, NO), the control proceeds to S94 to determine whether the current job is "print" or not. When YES at S94, the control proceeds to S95 to determine whether a read out operation is currently carried out by checking the read flag. When YES at S95, the control proceeds to S96 to set the subjob to "read". Then, the control returns to the main routine. When NO at S95, the control proceeds to S97 to set the subjob to "none". Then, the control returns to the main routine.

When the current job is not "print" (S94:NO) (and the current job is not "read"), the control proceeds to S97 to set the subjob to "none" as in the case of NO at S95. Then, the control returns to the main routine. The subjob is set to "none" when the current job is neither "read" nor "print". By the job determination process of S43, the state of copy machine 1 is determined to be any one of the aforementioned overall error state, the interruption state of both "read out operation" and "print operation", and the stand-by state.

Figure 11:
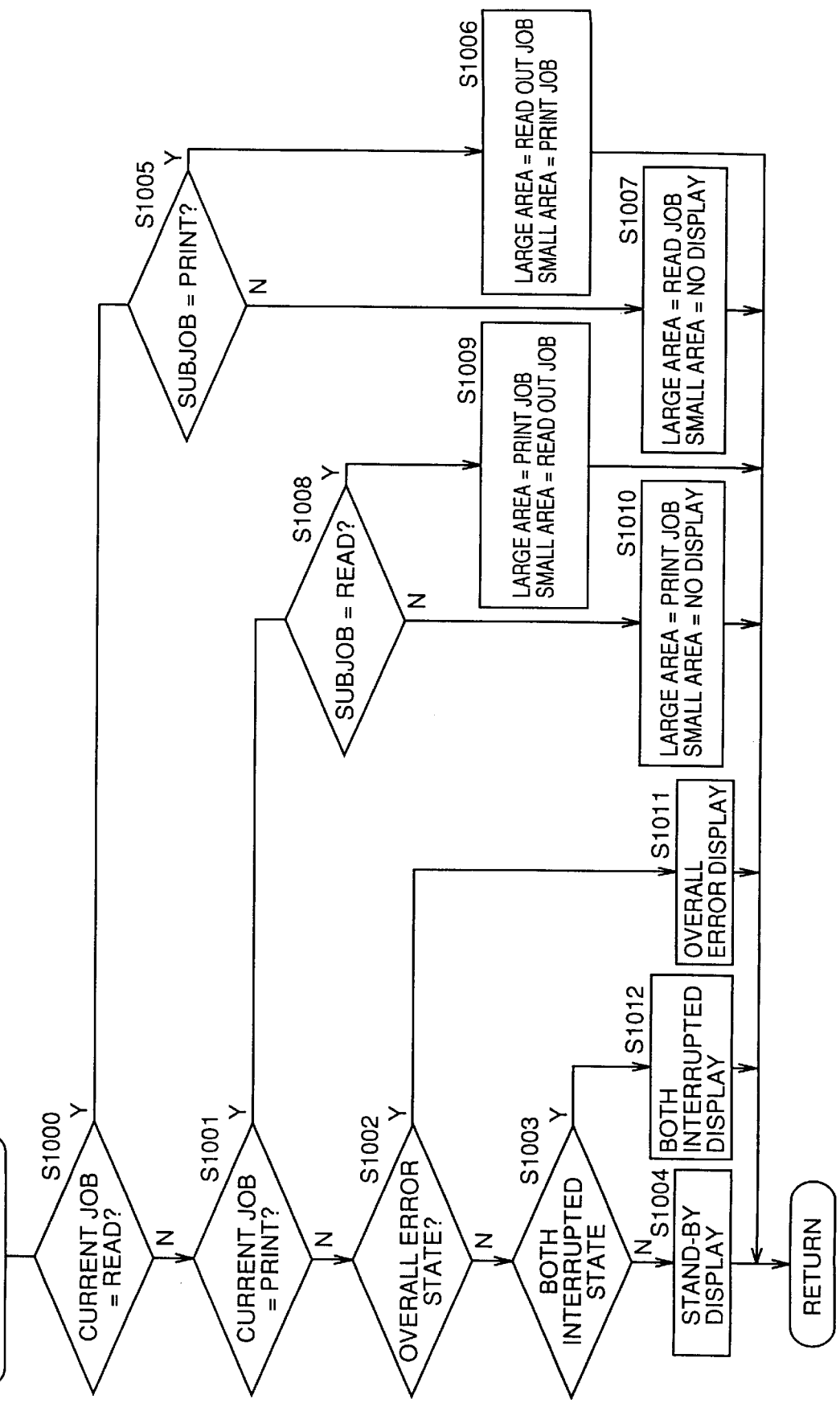
FIG. 11 is a flow chart showing the subroutine of the display process of a current job and a subjob as an alternative to the display process of S45 of FIG. 4.

FIG. 11 is a flow chart of the subroutine of the current job and subjob display process as an alternative to the display process of S45 of FIG. 4.

At S1000, determination is made whether the current job is "read". When YES at S1000, the control proceeds to S1005 to determine whether the subjob is "print" or not. When the subjob is "print" (S1005:YES), the control proceeds to S1006. The read out job is displayed in the large area and the print job is displayed in the small area. Then, the control returns to the main routine. When the subjob is not "print" (S1005:NO), the control proceeds to S1007. The read out job is displayed in the large area, and the display of the small area is canceled (nothing is displayed in the small area). Then, the control returns to the main routine. It is to be noted that when the current job is "read" and the subjob is not "print", the subjob will never be "read".

If the current job is not "read" (S1000:NO), the control proceeds to S1001 to determine whether the current job is "print" or not. When YES at S1001, the control proceeds to S1008 to determine whether the subjob is "read" or not. When YES at S1008, the control proceeds to S1009. The print job is displayed in the large area, and the read job is displayed in the small area. Then, the control returns to the main routine. When the subjob is not "read out" (S1008:NO), the control proceeds to S1010. The print job is displayed in the large area, and the display in the small area is erased. Then, the control returns to the main routine.

When the current job is not "print" (S1001:NO), the control proceeds to S1002 to determine whether the overall error state has been generated by checking a flag that is set when an overall error state is attained. When YES at S1002, the control proceeds to S1011. A display indicating an overall error state is provided. When NO at S1002, the control proceeds to S1003 to determine whether both the two operations are in an interrupted state by checking the print interrupt flag and the read interrupt flag. When both are interrupted (S1003:YES), the control proceeds to S1012 to provide a display indicating that both "read" and "print" operations are interrupted. When NO at S1003, the control proceeds to S1004 to provide a display indicating that copy machine 1 attains a stand-by state. Then, the control returns to the main routine.

FIG. 12 shows a message provided on the display. It is possible to display both the state of copy machine 1 and an instruction to the operator in the large area, and only the state of copy machine 1 in the small area. Therefore, the LCD can be used effectively.

According to the present invention, the operator can easily handle the present image forming apparatus with a multi-job function.

Although an image reader IR is employed as an input device of an original image, an externally connected computer, facsimile, and the like can be used as the input device.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus having a multi-job function, comprising:

an image reader, an image forming device that can form an image under a plurality of operation conditions, wherein an image forming operation by said image forming device on a first original group can be performed simultaneously with a reading operation by said image reader on a second original group, said first original group being different from said second original group, a first sense device for sensing a state of said image reader, a second sense device for sensing a state of said image forming device, a determination device for determining a desired job state in said image forming apparatus by sensed results of said first and second sense devices, and a display device for providing a display of information related to a result of said determination device.

2. The image forming apparatus according to claim 1, wherein said display device can simultaneously display information indicating that said image forming device is currently in operation and information indicating that said image reader is currently in operation.

3. The image forming apparatus according to claim 1, wherein said display device can simultaneously display information related to an operation to be completed by said image forming device and information related to said image forming device.

4. An image forming apparatus having a multi-job function comprising:

an image reader which operates according to an operation selected by an operator, an image forming device that can form an image by a plurality of operation conditions, wherein an image forming operation by said image forming device on a first original group can be performed simultaneously with a reading operation by said image reader on a second original group, said first original group being different from said second original group, a first sense device for sensing whether an operation of said image reader is selected or not, a second sense device for detecting a desired job state in said image forming device, a determination device for determining a state of said image forming apparatus by sensed results of said first and second sense devices, and a display device for providing a display of information related to a result of said determination device.

5. The image forming apparatus according to claim 4, wherein said display device can simultaneously display information indicating that said image forming device is currently in operation and information indicating that said image reader is currently in operation.

6. The image forming apparatus according to claim 4, wherein said display device can simultaneously display information related to an operation to be completed by said image forming device and information related to said image forming device.

7. An image forming apparatus having a multi-job function comprising:

an image reader, an image forming device that can form an image under a plurality of operation conditions, wherein an image forming operation by said image forming device on a first original group can be performed simultaneously with a reading operation by said image reader on a second original group, said first original group being different from said second original group, a first sense device for sensing a state of said image reader, a second sense device for sensing a desired job state in said image forming device, a determination device for determining a state of said image forming apparatus according to sensed results of said first and second sense devices, and a display device for providing a display of information related to a result of said determination device, wherein said display device comprises:

a first display for displaying a determined job operation of said image forming apparatus, and a second display for displaying a job operation other than said determined state of said image forming apparatus.

8. The image forming apparatus according to claim 7, wherein said first display is greater in area than said second display.

9. An image forming apparatus having a multi-job function comprising:

an image reader which operates according to an operation selected by an operator, an image forming device that can form an image under a plurality of operation conditions, wherein an image forming operation by said image forming device on a first original group can be performed simultaneously with a reading operation by said image reader on a second original group, said first original group being different from said second original group, a first sense device for sensing whether an operation of said image reader is selected or not, a second sense device for sensing a state of said image forming device, a determination device for determining a desired job state of said image forming apparatus by sensed results of said first and second sense devices, and a display device for providing a display of information related to a result of said determination device, wherein said display device comprises:

a first display for providing a display of a determined job operation of said image forming apparatus, and a second display for providing a display of a job operation other than said determined desired job operation of said image forming apparatus.

10. The image forming apparatus according to claim 9, wherein said first display is greater in area than said second display.

* * * * *